United States Patent [19]

Nakatsu

[11] Patent Number: 5,625,311
[45] Date of Patent: Apr. 29, 1997

[54] SYSTEM CLOCK GENERATING CIRCUIT HAVING A POWER SAVING MODE CAPABLE OF MAINTAINING A SATISFACTORY PROCESSING SPEED

[75] Inventor: Shinichi Nakatsu, Kanagawa, Japan

[73] Assignee: NEC Corporation, Tokyo, Japan

[21] Appl. No.: 239,520

[22] Filed: May 9, 1994

[30] Foreign Application Priority Data

May 7, 1993 [JP] Japan ................................ 5-105783

[51] Int. Cl.$^6$ ........................................................ G06F 1/04
[52] U.S. Cl. ............................ 327/293; 327/99; 327/295; 326/93; 395/551
[58] Field of Search ................................ 327/291, 292, 327/295, 296, 297, 141, 145, 149, 212, 144, 146; 331/1 A, 17, 18, 25; 326/93, 96; 395/550

[56] References Cited

U.S. PATENT DOCUMENTS

| | | | |
|---|---|---|---|
| 4,965,524 | 10/1990 | Patchen | 327/99 |
| 5,025,387 | 6/1991 | Frane | 364/493 |
| 5,033,001 | 7/1991 | Ibi | 364/200 |
| 5,077,686 | 12/1991 | Rubinstein | 395/550 |
| 5,099,140 | 3/1992 | Mudgett | 327/144 |
| 5,099,141 | 3/1992 | Utsonomiya | 327/99 |
| 5,289,138 | 2/1994 | Wang | 327/298 |
| 5,315,181 | 5/1994 | Schowe | 327/152 |
| 5,345,109 | 9/1994 | Mehta | 327/115 |
| 5,418,969 | 5/1995 | Matsuzaki et al. | 395/750 |
| 5,426,755 | 6/1995 | Yokouchi et al. | 395/425 |
| 5,483,659 | 1/1996 | Yamamura | 395/800 |

FOREIGN PATENT DOCUMENTS 61-109126  10/1984  Japan.

*Primary Examiner*—Timothy P. Callahan
*Assistant Examiner*—Kenneth B. Wells
*Attorney, Agent, or Firm*—Whitham, Curtis, Whitham & McGinn

[57] ABSTRACT

A system clock generating circuit for supplying a system clock to a microprocessor, includes a first oscillator for generating a main clock, and a second oscillator for generating a sub clock which is lower in frequency than the main clock. A twin-clock control circuit receives the main clock and the sub clock and is controlled by the microprocessor. When the microprocessor is in an ordinary operating condition, the twin-clock control circuit generates a (n)-phase system clock which is composed of (n) clocks for each one instruction cycle, where "n" is a positive even number. When the microprocessor is in an electric power saving mode, the twin-clock control circuit also generates a (n/m)-phase system clock which is composed of (n/m) clocks for each one instruction cycle, where "m" is a positive even number but is smaller than "n".

20 Claims, 3 Drawing Sheets

SYSTEM CLOCK GENERATING CIRCUIT HAVING A POWER SAVING MODE CAPABLE OF MAINTAINING A SATISFACTORY PROCESSING SPEED

BACKGROUND OF THE INVENTION

1. Field of the Invention

The present invention relates to a semiconductor integrated circuit, and more specifically to a semiconductor integrated circuit configured to generate a system clock for use in a microprocessor or the like.

2. Description of Related Art

In the prior art, in order to reduce electric power consumption, this type of semiconductor integrated circuit has been constructed to selectively use and control two oscillators of different oscillation frequencies so as to generate a necessary system clock to be supplied to a microprocessor, as shown in Japanese Patent Application laid-open Publication No. JP-A-61-109126.

Referring to FIG. 1A, there is shown a block diagram illustrating the system clock generating circuit (twin-clock control circuit) disclosed in Japanese Patent Application laid-open Publication No. JP-A-61-109126. The twin-clock control circuit, generally designated by Reference Numeral 3, includes a selector 5 coupled to two oscillators 1 and 2 of different oscillation frequencies and controlled by a microprocessor 4, and a system clock generation circuit 9 coupled to an output of the selector 5 so as to receive a clock generated by a selected oscillator and to generate a system clock to the microprocessor 4.

In the circuit shown in FIG. 1A, the oscillator 1 is configured to generate system clock of a sufficiently high frequency to meet with a high speed processing of the microprocessor 4. This system clock will be called a "main clock" hereinafter. The oscillator 2 is adapted to produce a clock corresponding to a low processing speed of the microprocessor 4. This clock will be called a "sub clock" hereinafter, and is used for a low power consumption operation of the microprocessor. The main and sub clocks are supplied from the oscillators 1 and 2 to the selector 5, in which either of the main and sub clocks is selected under control of the microprocessor 4, and then, supplied to the system clock generation circuit 9. In response to the clock selected by the selector 5, the system clock generation circuit 9 generates a high or low speed system clock, which is then supplied to the microprocessor 4.

Turning to FIG. 1B, there is shown another conventional twin-clock control circut. In FIG. 1B, elements similar or corresponding to those shown in FIG. 1A are given the same Reference Numerals, and explanation thereof will be omitted for simplification of description.

As seen from a comparison between FIGS. 1A and 1B, the second conventional twin-clock control circuit is featured in that the selector 5 receives the output of the oscillator 2 through a frequency multiplying circuit 10.

Accordingly, the main clock generated by the oscillator 1, and a clock obtained by frequency-multiplying the sub clock generated by the oscillator 2 by action of the frequency multiplying circuit 10, are supplied to the selector 5, so that either of the two clocks is selected under control of the microprocessor 4, as similarly to the first conventional twin-clock control circuit. Furthermore, similarly to the first conventional twin-clock control circuit, the system clock generation circuit 9 receives the clock selected by the selector 5, and generates a system clock, which is then supplied to the microprocessor 4.

In a semicondutor integrated circuit including the above-mentioned conventional twin-clock control circuit, when the main clock is stopped and the sub clock is selected so that the microprocessor operates on the basis of the system clock generated from the sub clock, the microprocessor is set in an operating mode for saving electric power (electric power saving mode). Namely, only the oscillator of a necessary minimum frequency is caused to operate. Accordingly, the processing speed of the microprocessor based on the sub clock may become too low, namely, greatly lower than a necessary or acceptable minimum processing speed.

In addition, in the case of using the frequency multiplying circuit, since the frequency multiplying circuit is required to have extremely high precision, circuit designing becomes very difficult. A reason for this is because the frequency multiplying circuit is inherently unstable against variations in temperature.

SUMMARY OF THE INVENTION

Accordingly, it is an object of the present invention to provide a system clock generating circuit which has overcome the above-mentioned defect of the conventional circuit.

Another object of the present invention is to provide a system clock generating circuit capable of generating, in an electric power saving mode, a system clock permitting a microprocessor to operate at a satisfactory processing speed.

Still another object of the present invention is to provide a system clock generating circuit capable of generating a system clock permitting a microprocessor to operate at a satisfactory processing speed, in an electric power saving mode, without a frequency multiplying circuit connected to a sub clock generating oscillator.

The above and other objects of the present invention are achieved in accordance with the present invention by a system clock generating circuit for supplying a system clock to a microprocessor. The system clock generating circuit comprises a first oscillator for generating a main clock of a first frequency, a second oscillator for generating a sub clock of a second frequency which is lower than the first frequency, and a twin-clock control circuit receiving the main clock and the sub clock and controlled by the microprocessor so as to generate a system clock to be supplied to the microprocessor. The twin-clock control circuit generates, when the microprocessor is an ordinary operating condition, a (n)-phase system clock which is composed of (n) clocks for each one instruction cycle, where "n" is a positive even number. The twin-clock control circuit also generates, when the microprocessor is a consumed electric power saving mode, a (n/m)-phase system clock which is composed of (n/m) clocks for each one instruction cycle, where "m" is a positive even number but is smaller than "n".

In one preferred embodiment, the twin-clock control circuit includes a selector receiving the main clock and the sub clock and controlled by the microprocessor so as to select one of the main clock and the sub clock, a first system clock generation circuit receiving the clock outputted from the selector for generating the above mentioned (n)-phase system flock to the microprocessor, and a second system clock generation circuit receiving the clock outputted from the selector for generating the above-mentioned (n/m)-phase system clock to the microprocessor.

The above and other objects, features and advantages of the present invention will be apparent from the following description of preferred embodiments of the invention with reference to the accompanying drawings.

DESCRIPTION OF THE PREFERRED EMBODIMENTS

Figure 1A:
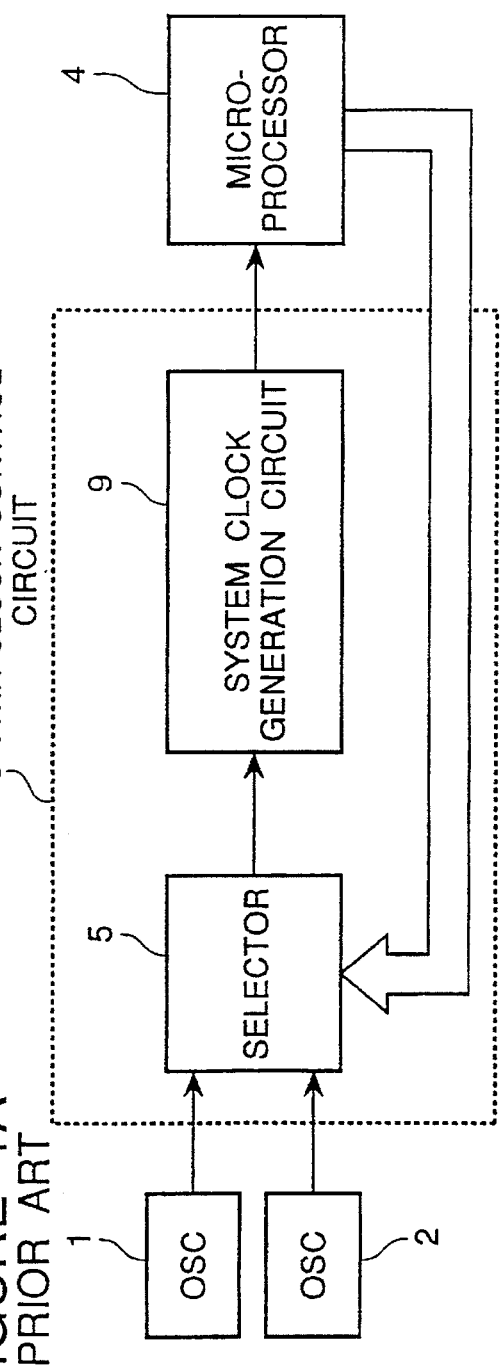
FIG. 1A is a block diagram illustrating one example of the conventional system clock generating circuit.
Figure 1B:
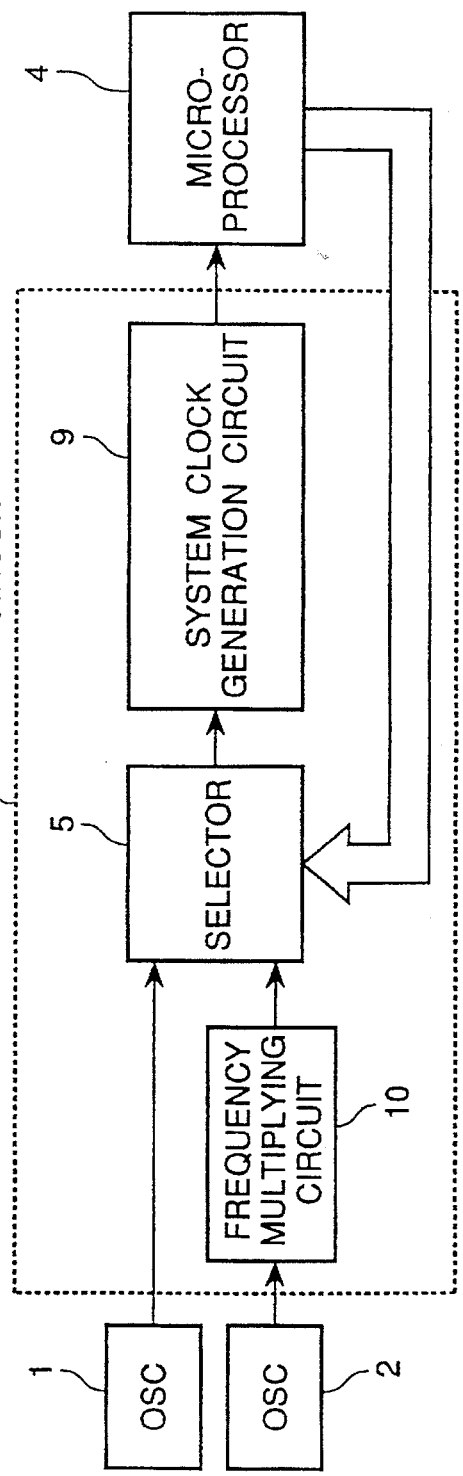
FIG. 1B is a block diagram illustrating another example of the conventional system clock generating circuit.
Figure 2:
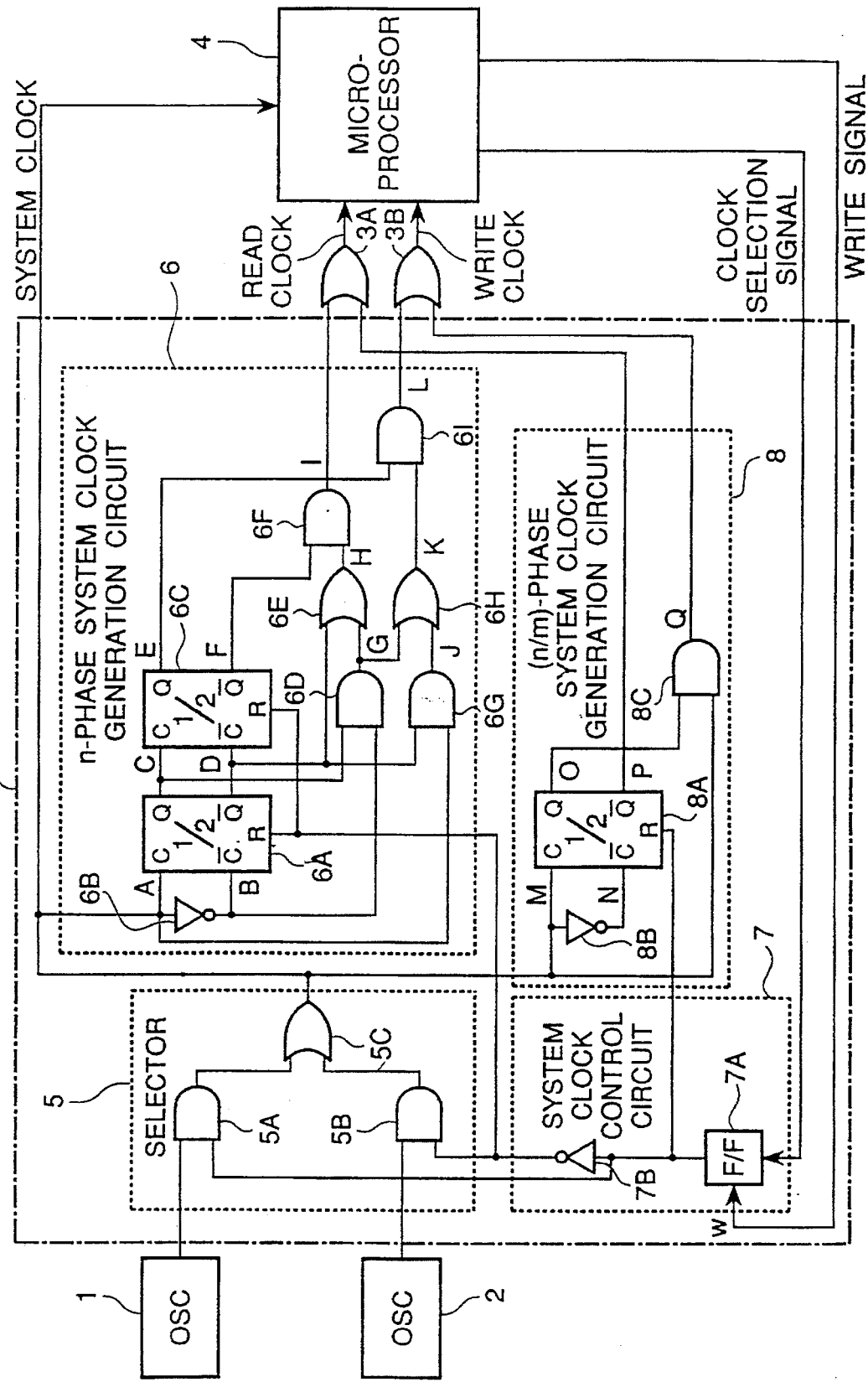
FIG. 2 is a block diagram of an embodiment of the system clock generating circuit in accordance with the present invention.

Referring to FIG. 2, there is shown a block diagram of an embodiment of the system clock generating circuit in accordance with present invention. In FIG. 2, elements corresponding to those shown in FIG. 1A are given the same Reference Numerals.

The system clock generating circuit includes a first oscillator 1 for generating a main clock of a first frequency, and a second oscillator 2 for generating a sub clock of a second frequency which is lower than the first frequency. The main clock generated by the oscillator 1 and the sub clock generated by the oscillator 2 are supplied to a twin-clock control circuit 3, which is in turn controlled by a microprocessor 4 so as to supply a controlled system clock to the microprocessor 4.

The twin-clock control circuit 3 includes a selector 5 coupled to receive the main clock generated by the oscillator 1 and the sub clock generated by the oscilltor 2, and controlled through a system clock control circuit 7 by the microprocessor 4.

The system clock control circuit 7 includes a latch circuit 7A connected to receive a clock selection signal from the microprocessor 4 and to latch the clock selection signal in response to a write signal from the microprocessor 4. An output of the latch 7A is connected to an input of an inverter 7B. On the other hand, the selector 5 includes an AND gate 5A having a first input connected to receive the main clock generated by the oscillator 1 and a second input connected to the output of the latch 7A. The selector 5 also includes another AND gate 5B having a first input connected to receive the sub clock generated by the oscillator 2 and a second input connected to an output of the inverter 7B. An output of each of the AND gates and 5B is connected to an OR gate 5C, which in turn supplies a system clock (for determining a machine cycle) to the microprocessor 4.

With this arrangement, when the clock selection signal from the microprocessor 4 is at a high level and latched in the latch 7A, the AND gate 5A is opened and the AND gate 5B is blocked, so that the main clock generated by the oscillator 1 is selected and supplied through the OR gate 5C as the output of the selector 5. On the other hand, when the clock selection signal from the microprocessor 4 is at a low level and latched in the latch 7A, the AND gate 5A is blocked, and the AND gate 5B is opened since the output of the inverter 7B becomes a high level, so that the sub clock generated by the oscillator 2 is selected and supplied through the OR gate 5C as the output of the selector 5.

The output of the selector 5 is supplied to a (n)-phase system clock generation circuit 6 (where "n" is a positive even number) and a (n/m)-phase system clock generation circuit 8 (where "m" is a positive even number but is smaller than "n"), both of which are also controlled by the system clock control circuit 7.

In the case of "n"=4, the (n)-phase system clock generation circuit 6 includes a flipflop 6A having a non-inverted clock input C connected to the output of the OR gate 5C, an inverted clock input $\overline{C}$ connected through an inverter 6B to the output of the OR gate 5C, and a reset input R connected to the output of the inverter 7B. A pair of complementary outputs Q and $\overline{Q}$ of the flipflop 6A are connected to a non-inverted clock input C and an inverted clock input $\overline{C}$ of another flipflop 6C, which also has a reset input R connected to the output of the inverter 7B.

The (n)-phase system clock generation circuit 6 also includes an AND gate 6D receiving the output of the inverter 6B and the non-inverted output Q of the flipflop 6A, an OR gate 6E receiving an output of the AND gate 6D and the inverted output $\overline{Q}$ of the flipflop 6A, and an AND gate 6F receiving an output of the OR gate 6E and the inverted output $\overline{Q}$ of the flipflop 6C, an output of the AND gate 6F generating a read clock "T" for an ordinary operation of the microprocessor 4. Furthermore, the (n)-phase system clock generation circuit 6 includes an AND gate 6G receiving the output of the OR gate 5C and the inverted output $\overline{Q}$ of the flipflop 6A, an OR gate 6H receiving an output of the AND gate 6G and the output of the AND gate 6D, and an AND gate 6I receiving an output of the OR gate 6H and the non-inverted output Q of the flipflop 6C, an output of the AND gate 6I generating a write clock "L" for the ordinary operation of the microprocessor 4.

On the other hand, in the case of "m"=2, the (n/m)-phase system clock generation circuit 8 includes a flipflop 8A having a non-inverted clock input C connected to the output of the OR gate 5C, an inverted clock input $\overline{C}$ connected through an inverter 8B to the output of the OR gate 5C, and a reset input R connected to the output of the latch 7A, and an AND gate 8C receiving an non-inverted output Q of the flipflop 8A and the output of the OR gate 5C. With this arrangement, the inverted output $\overline{Q}$ of the flipflop 8A generates a read clock "P" for a power saving mode operation of the microprocessor 4, and an output of the AND gate 8C generates a write clock "Q" for the power saving mode operation of the microprocessor 4.

The output of the AND gate 6F and the inverted output $\overline{Q}$ of the flipflop 8A are supplied through an OR gate 3A to the microprocessor 4 as the read clock, and the output of the AND gate 6I and the output of the AND gate 8C are supplied through another OR gate 3B to the microprocessor 4 as the write clock.

When the clock selection signal from the microprocessor 4 is at the high level and latched in the latch 7A, since the output of the latch 7A is also at the high level, the flipflop 8A is maintained in a reset condition, and therefore, the (n/m)-phase system clock generation circuit 8 is not operable. On the other hand, since the flipflops 6A and 6C are operable, the (n)-phase system clock generation circuit 6 is also operable. If the clock selection signal from the microprocessor 4 is at the low level and latched in the latch 7A, since the output of the inverter 7B is maintained at the high level, the flipflops 6A and 6C are maintained in a reset condition, and therefore, the (n)-phase system clock generation circuit 6 is not operable. However, since the output of the latch 7A is maintained at the low level, the flipflop 8A and hence the (n/m)-phase system clock generation circuit 8, is operable.

Now, operation will be described with reference to FIG. 3, which shows the waveform of signals appearing at various points "A" to "Q" in the circuit shown in FIG. 2. Accordingly, it should be understood that the waveforms "A" to "Q" illustrated in FIG. 3 respectively show the waveform of signals appearing at corresponding points "A" to "Q" in the circuit shown in FIG. 2. In addition, the waveforms "A" to "L" shown in FIG. 3 illustrate the waveforms when the main clock is selected, namely, the clock selection signal generated by the microprocessor 4 is at the high level, and the waveforms "M" to "Q" shown in FIG. 3 illustrate the waveforms when the sub clock is selected, namely, the clock selection signal generated by the microprocessor 4 is at the low level.

Figure 3:
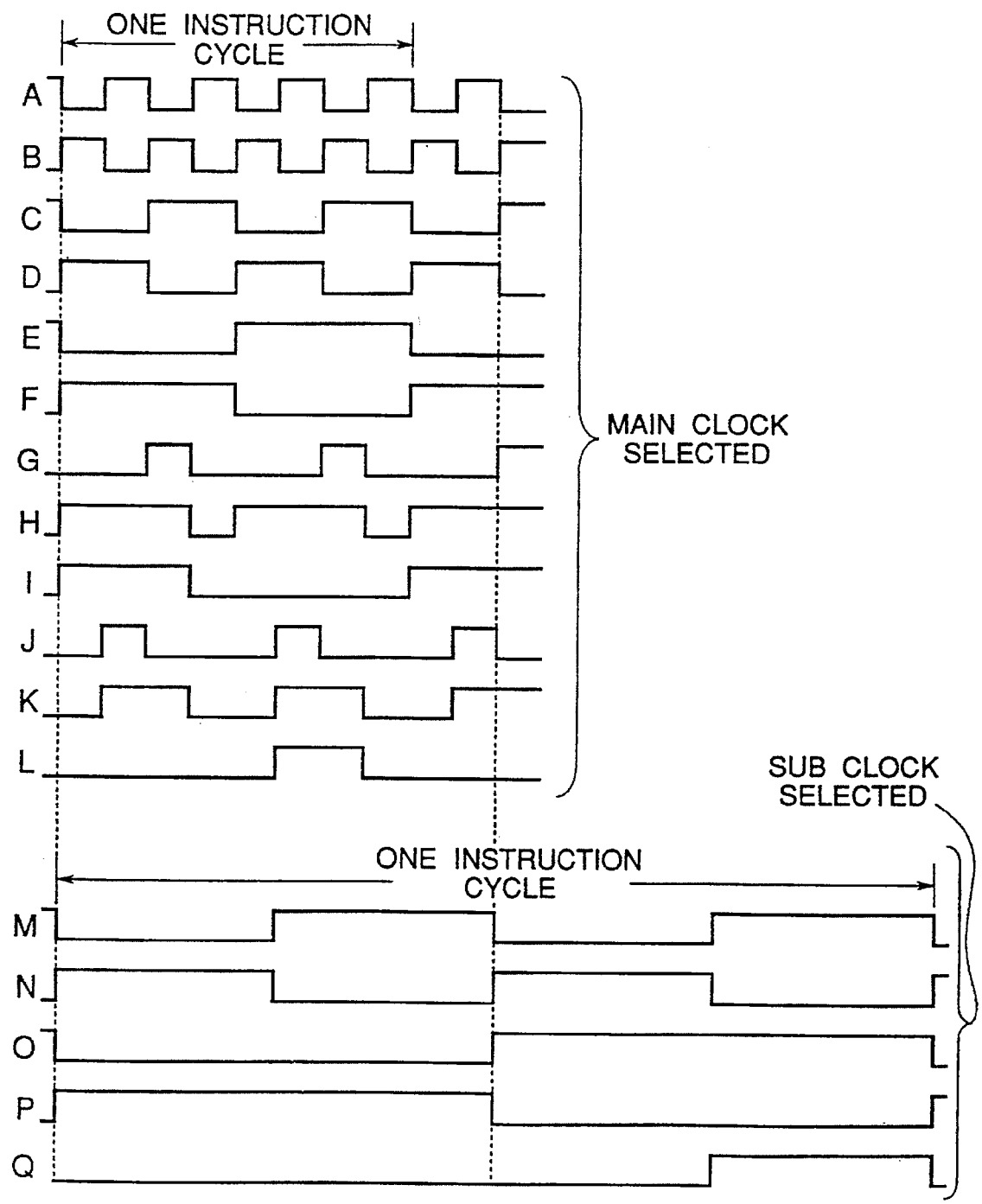
FIG. 3 is a timing chart illustrating the waveform of signals appearing on various points in the circuit shown in FIG. 2.

When the clock selection signal generated by the microprocessor 4 is at the high level, the (n/m)-phase system clock generation circuit 8 is not operable as mentioned above, and the (n)-phase system clock generation circuit 6 receives the main clock as shown at "A" in FIG. 3, which is also supplied to the microprocessor 4 as the system clock. As a result, the AND gate 6F generates the pulse as shown at "I" in FIG. 3, which is then supplied as the read clock to the microprocessor 4, and the AND gate 6I generates the pulse as shown at "L" in FIG. 3, which is then supplied as the write clock to the microprocessor 4. Accordingly, in this ordinary operation mode, one instruction cycle (completely including at least both of the read clock and the write clock) is composed of four system clocks (namely, four machine cycles), as will be understood from "A" in FIG. 3. Namely, "N"=4.

On the other hand, when the clock selection signal generated by the microprocessor 4 is at the low level, the (n)-phase system clock generation circuit 6 is not operable as mentioned above, and the (n/m)-phase system clock generation circuit 8 receives the sub clock as shown at "M" in FIG. 3, which is also supplied to the microprocessor 4 as the system clock. In the shown example, the sub clock M has a frequency that is one-fifth of that of the main clock shown at "A" in FIG. 3. However, the flipflop 8A generates the pulse as shown at "P" in FIG. 3, which is then supplied as the read clock to the microprocessor 4, and the AND gate 8C generates the pulse as shown at "Q" in FIG. 3, which is then supplied as the write clock to the microprocessor 4. Accordingly, in this power saving mode, one instruction cycle (completely including at least both of the read clock and the write clock) is composed of two system clocks (namely, two machine cycles), as will be understood from "M" in FIG. 3. Namely, "M"=2. However, the period of one instruction cycle in the power saving mode corresponds to only two and one-half of the period of one instruction cycle in the ordinary operation mode, although the frequency of the system clock was lowered to one-fifth of that in the ordinary operation mode.

As will be apparent from the above, when the system clock is changed from the main clock of a high frequency to the sub clock of a low frequency, the number of machine cycles of one instruction cycle can be made small by changing the phase number of the system clock from the (n)-phase to the (n/m)-phase. Therefore, the processing speed of the microprocessor does not so drop in comparison with the drop of the frequency from the main clock to the sub clock. Namely, the processing speed of the microprocessor can be maintained at a relatively high level, although the frequency of the clock has greatly dropped from the main clock to the sub clock. In this connection, no frequency multiplying circuit is required.

The invention has thus been shown and described with reference to the specific embodiments. However, it should be noted that the present invention is in no way limited to the details of the illustrated structures but changes and modifications may be made within the scope of the appended claims.

I claim:

1. A system clock generating circuit for supplying a system clock to a microprocessor, the system clock generating circuit comprising:

a first oscillator for generating a main clock signal having a first frequency, a second oscillator for generating a sub clock signal having a second frequency, said second frequency being lower than said first frequency, a twin-clock control circuit receiving said main clock signal and said sub clock signal and being controlled by said microprocessor so as to generate, based on said main clock signal and said clock signal, a system clock to be supplied to said microprocessor, said twin-clock control circuit generating, when said microprocessor is operating in an ordinary operating speed mode, an (n)-phase system clock, based on said main clock selected as said system clock, which comprises (n) clock pulses for each one instruction cycle, where (n) is a positive even number, and when said microprocessor is in a power saving mode, said twin-clock control circuit generating, based on said sub clock selected as said system clock, an (n/m)-phase system clock which comprises (n/m) clock pulses for each one instruction cycle of said microprocessor, where (m) is a positive even number smaller than (n).

2. A system clock generating circuit as recited in claim 1, wherein said twin-clock control circuit comprises:

a selector for receiving said main clock signal and said sub clock signal and being controlled by said microprocessor so as to select one of said main clock signal and said sub clock signal as said system clock, an (n) phase system clock generation circuit for receiving said system clock outputted from said selector, and for outputting said (n)-phase system clock to said microprocessor, and an (n/m)-phase system clock generation circuit receiving said system clock outputted from said selector for outputting said (n/m)-phase system clock to said microprocessor.

3. A system clock generating circuit as recited in claim 2, wherein said (n)-phase system clock comprises:

a first flip-flop having a non-inverting clock input and an inverting clock input, said first flip-flop receiving said system clock at said non-inverting input and an inverted system clock signal at said inverting clock input.

4. A system clock generating circuit as recited in claim 3, wherein said (n)-phase system clock further comprises:

a second flip-flop having a non-inverting input connected to a non-inverting output of said first flip-flop and an inverting input connected to the inverting output of said first flip-flop; and a first AND gate having a first input connected to said inverted system clock signal and a second input connected to said non-inverting output of said first flip-flop.

5. A system clock generating circuit as recited in claim 4, wherein said ordinary operating speed mode comprises a normal mode, and wherein said (n)-phase system clock further comprises:

a first OR gate having a first input connected to an output of said first AND gate and a second input connected to said inverting output of said first flip-flop;

a second AND gate having a first input connected to an output of said first OR gate and a second input connected to a non-inverting output of said second flip-flop, said second AND gate outputting a normal mode read clock signal; and a third AND gate having a first input receiving said system clock signal and a second input and a second input connected to said inverting output of said first flip-flop.

6. A system clock generating circuit as recited in claim 5, wherein said (n)-phase system clock further comprises:

a second OR gate having a first input connected to the output of said third AND gate and a second input connected to said output of said first AND gate; and a fourth AND gate having a first input connected to an output of said second OR gate and a second input connected to an non-inverting output of said second flip-flop, said fourth AND gate outputting a normal mode write clock signal.

7. A system clock generating circuit as claimed in claim 2, wherein said ordinary operating speed mode comprises a normal mode, and wherein said (n/m)-phase system clock comprises:

a flip-flop receiving said system clock at a non-inverting input and receiving an inverted system clock at an inverting input, an inverting output of said flip-flop outputting a power saving mode read clock signal which has a longer period than said read clock signal in said normal mode; and an AND gate having a first input connected to a non-inverting output of said third flip-flop and a second output for receiving said system clock, said fifth AND gate outputting a power saving mode write clock signal which has a longer period than said write clock signal in said normal mode.

8. A system clock generating circuit as claimed in claim 2, wherein said ordinary operating speed mode comprises a normal mode, and wherein said (n/m)-phase system clock comprises:

a flip-flop receiving said system clock at a non-inverting input and receiving an inverted system clock at an inverting input, an inverting output of said flip-flop outputting a power saving mode read clock signal which has a longer period than said read clock signal in said normal mode.

9. A system clock generating circuit as claimed in claim 8, wherein said (n/m)-phase system clock further comprises:

an AND gate having a first input connected to a non-inverting output of said third flip-flop and a second output for receiving said system clock.

10. A system clock generating circuit as recited in claim 1, wherein said twin-clock control circuit comprises:

a selector for receiving said main clock signal and said sub clock signal and for being controlled by said microprocessor so as to select one of said main clock signal and said sub clock signal as said system clock.

11. A system clock generating circuit as recited in claim 10, wherein said twin-clock control circuit further comprises:

an (n)-phase system clock generation circuit, receiving said system clock outputted from said selector, for outputting said (n)-phase system clock to said microprocessor.

12. A system clock generating circuit as recited in claim 11, wherein said twin-clock control circuit further comprises:

an (n/m)-phase system clock generation circuit, receiving said system clock outputted from said selector, for outputting said (n/m)-phase system clock to said microprocessor.

13. A microprocessor clock generating circuit for reducing a number of clock pulses per instruction cycle when in a microprocessor power saving mode, comprising:

a first oscillator for generating normal speed clock pulses for a microprocessor normal mode;

a second oscillator for generating a reduced speed clock pulses for a microprocessor power saving mode;

a selection circuit for selecting said first oscillator when said microprocessor is in said normal mode and for selecting said second oscillator when said microprocessor is in said power saving mode;

a twin-clock control circuit for controlling a number of clock pulses per instruction cycle of said microprocessor where one instruction cycle comprises a read clock signal and a write clock signal, said read clock signal and said write clock signal being generated according to said number of said clock pulses;

wherein if said microprocessor is in said normal mode, said twin-clock control circuit generates a read clock signal and a write clock signal in n clock pulses, where n is an even number, and wherein if said microprocessor is in said power saving mode, said twin-clock control circuit generates a read clock signal and a write clock signal in n/m clock pulses, where m is an even number smaller than n.

14. A clock generating circuit as claimed in claim 13, wherein said twin clock control circuit comprises:

a first flip-flop having a non-inverting clock input and an inverting clock input, said first flip-flop receiving an output from said first oscillator at said non-inverting input and an inverted output of said first oscillator at said inverting clock input.

15. A clock generating circuit as claimed in claim 14, wherein said twin clock control circuit further comprises:

a second flip-flop having a non-inverting input connected to a non-inverting output of said first flip-flop and an inverting input connected to the inverting output of said first flip-flop.

16. A clock generating circuit as claimed in claim 15, wherein said twin clock control circuit further comprises:

a first AND gate having a first input connected to said inverted output of said first oscillator and a second input connected to said non-inverting output of said first flip-flop;

a first OR gate having a first input connected to an output of said first AND gate and a second input connected to said inverting output of said first flip-flop; and a second AND gate having a first input connected to an output of said first OR gate and a second input connected to a non-inverting output of said second flip-flop, said second AND gate outputting a normal mode read clock signal.

17. A clock generating circuit as claimed in claim 16, wherein said twin clock control circuit further comprises:

a third AND gate having a first input receiving said system clock signal and a second input connected to said inverting output of said first flip-flop;

a second OR gate having a first input connected to the output of said third AND gate and a second input connected to said output of said first AND gate; and a fourth AND gate having a first input connected to an output of said second OR gate and a second input connected to an non-inverting output of said second flip-flop, said fourth AND gate outputting a normal mode write clock signal.

18. A clock generating circuit as claimed in claim 13, further comprising:

a flip-flop receiving an output from said second oscillator at a non-inverting input and receiving an inverted output from said second oscillator, an inverting output of said flip-flop outputting a power saving mode read clock signal which has a longer period than said read clock signal in said normal mode;

an AND gate having a first input connected to a non-inverting output of said flip-flop and a second output receiving said output from said second oscillator, said AND gate outputting a power saving mode write clock signal which has a longer period than a write clock signal in said normal mode.

19. A device for reducing a number of clocks in an instruction cycle, comprising:

a fast clock to operate a microprocessor in a normal mode;

a slow clock to operate said microprocessor in a power saving mode;

mode selection means, connected to said fast clock and to said slow clock, for supplying one of said fast clock and said slow clock to said microprocessor; and instruction cycle controlling means, connected to said mode selection means, for controlling an instruction cycle timing to clock speed ratio, where an instruction cycle comprises a read clock signal followed by a write clock signal, said read clock signal and said write clock signal being generated according to a number of said clock pulses being issued, wherein, when said fast clock is selected, said instruction cycle controlling means generates a read clock signal and a write clock signal in n clock pulses, where n is an even number, and wherein, when said slow clock is selected, said instruction cycle controlling means generates a read clock signal and a write clock signal in n/m clock pulses, where m is an even number smaller than n.

20. A device according to claim 19, wherein n is 4 and m is 2.

* * * * *